United States Patent
Chee et al.

(10) Patent No.: US 12,432,307 B2
(45) Date of Patent: Sep. 30, 2025

(54) PERSONALIZED SEMANTIC BASED IMAGE EDITING

(71) Applicant: Black Sesame Technologies Inc., San Jose, CA (US)

(72) Inventors: Evelyn Chee, Singapore (SG); Yubo Duan, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 253 days.

(21) Appl. No.: 17/984,392

(22) Filed: Nov. 10, 2022

(65) Prior Publication Data

US 2024/0163388 A1    May 16, 2024

(51) Int. Cl.
*G10L 15/18* (2013.01)
*G10L 15/22* (2006.01)
*H04N 1/387* (2006.01)

(52) U.S. Cl.
CPC ......... *H04N 1/387* (2013.01); *G10L 15/1815* (2013.01); *G10L 15/22* (2013.01); *G10L 2015/223* (2013.01)

(58) Field of Classification Search
CPC ........................... G10L 15/1815; G10L 15/22
See application file for complete search history.

(56) References Cited

U.S. PATENT DOCUMENTS

| | | | |
|---|---|---|---|
| 5,990,901 A | 11/1999 | Lawton et al. | |
| 6,834,124 B1 | 12/2004 | Lin et al. | |
| 9,407,816 B1 | 8/2016 | Sehn | |
| 9,569,697 B1 | 2/2017 | McNerney et al. | |
| 9,754,355 B2 | 9/2017 | Chang et al. | |
| 10,776,860 B2* | 9/2020 | Sakamoto | G06Q 30/0643 |
| 11,099,469 B1* | 8/2021 | Selfe | G03B 21/2066 |
| 2013/0346920 A1* | 12/2013 | Morris | G06F 16/5866 715/835 |
| 2016/0093032 A1* | 3/2016 | Lei | G06T 5/70 382/264 |
| 2019/0005034 A1* | 1/2019 | Ben-Yair | G06F 16/24573 |
| 2021/0133931 A1* | 5/2021 | Lee | G06T 5/60 |
| 2021/0174193 A1* | 6/2021 | Pouran Ben Veyseh | G06F 40/30 |
| 2023/0126177 A1* | 4/2023 | Xu | G06T 5/60 382/275 |
| 2023/0283849 A1* | 9/2023 | Doshi | H04N 21/472 725/61 |

* cited by examiner

*Primary Examiner* — Bryan S Blankenagel
(74) *Attorney, Agent, or Firm* — Timothy T. Wang; Ni, Wang & Massand, PLLC

(57) ABSTRACT

This present invention discloses a personalized and user specific system for editing an image. The system utilizes voice commands that are supplemented by semantic learning to form semantic descriptors. In addition, the system also utilizes user preferences to term an edited image. The system is utilized especially by novice photo editors, to provide a desired filter effect to the image with relative ease.

18 Claims, 5 Drawing Sheets

PERSONALIZED SEMANTIC BASED IMAGE EDITING

FIELD OF THE INVENTION

The present invention generally relates to a system for providing image editing services. More specifically, to a system for enhancing and applying filter effects to images that are produced via image capturing devices. Particularly, the present invention involves the use of natural language descriptors to provide personalized image filters.

BACKGROUND OF THE INVENTION

The popularity and convenience of cameras coupled with the widespread use of computing devices connected to the Internet has caused digital images to be universally used. For example, digital photographs am regularly captured by camera devices included in other portable devices such as cellphones, tablet computers, wearable devices, etc. The cellphone based camera system has surpassed photographs taken with any other conventional camera system, emerging as the image capturing system of choice for novice photographers.

Images are often posted to various social networks to be shared with followers. However, many images, such as photographs taken by a camera on a cellphone, include characteristics unsatisfying to a user or other features that the user may wish to modify.

The editing and enhancement of images captured by cellular devices necessitates access to expensive and dedicated professional-level workstations, which is not feasible for the average user. Adding similar photography editing modules to cellphones via applications has made photograph editing features more available to users. Digital photography has an added advantage of quick review, ease of editing, and post-processing of images taken, in contrast to film based photography. There are many mobile based applications available today that strive to make photography editing easy to use with systems based pre-made visualizations, tools, and filters available.

To improve or change such images, a user commonly edits the images directly by opening an image in an image editing application and manually selecting and adjusting various characteristics such as brightness, contrast, saturation, blur, and alike characteristics. However, with the emergence of increasingly complex image enhancing tools and applications, the process has now become overly tedious, confusing, and time consuming for the average user.

The latest trend in image editing tools is the use of artificial intelligence approaches that aim to simplify various image enhancement recommendations, i.e., filters based on the user's photo editing habits or photo preferences. In an alternate approach, Samsung designed an app that extracts a filter from a given photo with a filter effect and then applies the same tilter to a new image. The major disadvantage of this method is that it ignores the possibility that the new image/old filter combination may deviate from the desired effect the user has in mind. In such a case, the user still has to search a large set of filter options, often rendering any recommendations redundant.

U.S. Pat. No. 6,834,124 discloses an adaptive system for processing and enhancement of images produced by an image capturing device. The invention focuses on changing the quality rather than applying effects to images. The process initiates by receiving a set of pixels to be printed, identifying a target pixel and at least one neighboring pixel, comparing the pixels within the observation window to a set of pixel templates, generating a template match, selecting one of a plurality of sets of optimized drive signals, and using the matched identifier to select one of the plurality of sets of optimized drive signals as enhanced image data. However, the system edits the image by improving pixels, and selecting filters manually. The system does not provide any approach for editing images automatically and not providing any personalized touch to editing of the image.

U.S. Pat. No. 9,407,816 discloses a technique to provide context aware filters to end users. The attributes associated with the user device includes established preferences that are explicitly stated preferences supplied by a user. Alternately, the established preferences may be derived from prior use patterns. The system generates filters or recommendations based on these established preferences accordingly. For example, the photograph may be evaluated to identity an urban setting, a rural setting, a sunset a seascape and the like. However, the system described herein describes that the established preferences derived from prior use patterns and edits image. The system does not provide any way for personalized filters for editing the image.

U.S. Pat. No. 9,569,697 discloses a method to reduce error while generating associations between an object and corresponding image. At least one locator for one or more regions of the image is stored corresponding to each object classification. The method further includes selection of a representative portion of the segmented image from a user, and matching the representative portion with the object data to determine one matched object and its classification.

U.S. Pat. No. 9,754,355 describes an image editing and filter application based out of objective analysis of the image. The patent discloses a similar approach to filter generation, wherein object criteria are used to draw associations between an object and a source of image data. For example, "Museum" associated photo filter may include images including data associated with a specific exhibit in the museum. In addition, the invention also discloses provision in which users are able to upload filter data for generating a photo filter and object criteria. The drawback of both the patents is that, when an image is retrieved from its classification for photo filter, the selection criteria based on object selection not description based. The filter thus created might deviate from the actual request filter as a result.

U.S. Pat. No. 5,990,901 discloses a technique in which the features of image to be edited are registered at system level with the corresponding features in a model of type of feature. An editing effect is applied to an image using the constraints determined by the properties of the model and the registered features. Although the model based processing of features extracted from an image uses contrasts based filters from the previous approaches. However, the system yet lacks true customization or personalization of images.

Therefore, the present invention is designed to address the specific challenges in the prior art. The present invention discloses a system using features derived out of natural language and user speech, instead of objects inherent of the image. The use of voice based attributes also enables the system of the present invention to infer mood or emotional status of the user from the voice data sampled as a prompt for editing.

To overcome the shortcomings of the prior art, there is a need to provide a system for image editing to generate highly personalized and unique image filters. The system generated and inbuilt effect palettes, gives many options to the user for image editing.

It is apparent now that numerous methods and systems are developed in the prior art that are adequate for various purposes. Furthermore, even though these inventions may be suitable for the specific purposes to which they address, such methods and systems are not suitable for the purposes of the present invention as described. Thus, there is a need to provide an improved and efficient system for editing an image that uses a natural language descriptors, which is an intuitive method for inexperienced users and simplifies the process of searching the correct filter effect.

SUMMARY OF THE INVENTION

In accordance with the present invention, the disadvantages and limitations of the prior art are substantially overcome by providing a personalized image editing system for modifying an image by determining likes and preferences of a user.

An improved system for editing an image to form an edited image is disclosed. The system includes an imaging module to receive the image, a speech module to receive a speech from a user, and a processor for processing the image. The processor includes a speech extractor for extracting a context from the speech, and an encoder-decoder for extracting a number of semantic features from the context. The encoder-decoder generates a tag based on a semantic feature.

Further, the system includes a filtering module for generating and applying filters to the image. The filtering module includes a first filter, which is extracted by using the tag and applied on the image to form a filtered image, and a second filter, which the second filter is applied on the filtered image based on a user preference to generate the edited image. The application of each of the first filter and the second filter is based on an artificial intelligence based model.

A primary objective of the present invention is to provide a system for editing an image or a photo by using a speech recognition engine that applies a filter in consideration of a user's emotion and, thereby, applying filters which matches a user's mood in addition to the desired effect.

Another objective of the present invention is to provide a personalized image editing system that helps users apply a desired filter using natural language descriptors, which is a more intuitive method for inexperienced users and simplifies the process of searching for the correct filter effect.

Yet another objective of the present invention is to provide a user-friendly system for editing an image that edits the image by finding out likes of a user through usage history or on-boarding questions and, thereby, applies the associated style of the user on top of the desired filter effect.

Another objective of the present invention is to provide automated effect filters and to exclude the typical process of searching and scanning large libraries of effects in image editing tools. The object is to use techniques of the present invention to make photo editing easier and less time consuming for the end users.

Yet another objective of the present invention is to provide a personalized image editing system that utilizes spoken words of a user and then convert it into text descriptions. This helps the system to discern "semantic context" of the natural language prompt, thereby making the process of applying photo effects more context-aware in real-time.

Another objective of the present invention is to provide a system that utilizes supplemental semantic learning by investigating user preferences at device level or via an image database that are populated against semantic descriptors. The merging of semantic learning with these methodologies creates a more personalized and user specific image effect filter.

Yet another objective of the present invention is to provide a system in which the images that are captured using camera systems at user devices are edited using a typical image filter associated with a text descriptor. This image is converted into a desired image, wherein the ordinary image effect is transformed into updated image effect by blending descriptors with user's personal editing style. By using training models to transform the filters, it is also possible to streamline the filter suggestions with targeted and personalized options for user to choose from. This makes image editing user-friendly.

Another objective of the present invention is to provide a system for editing an image that reduces the user's need, especially for inexperienced photo editors, to go through filters or photos to find the one which provide the desired effect.

In one aspect of the present invention, the imaging module is either of a lens or a camera. In another aspect of the present invention, the speech module is a microphone. The lens, camera, and microphone may be of any electronic device. The electronic device is either of a digital camera, a PDA, a cellphone, a tablet, a laptop or any computing device.

In another aspect of the present invention, the semantic features are either a word or text descriptor. The word or text descriptor is an encoded version of voice commands provided by applying the filters to the image.

In yet another aspect of the present invention, the first filter is extracted from an image database. The image database is either of a web server, a social networking site, or a web page. The image database may be a memory of any computing device. The image database is screened according to the tag and an aesthetic value.

In another aspect of the present invention, the second filter is applied on the basis of a user preferences. The user preference includes editing style preferences and/or image quality preferences of the user associated with the image. The image quality preferences are either of saturation, contrast, size, dimension, or a sharpness of the image. The editing style preferences is either of brightness, color hue, or color palettes. Further, the user preferences are collected either from a questionnaire, web histories, or user usage history.

In another aspect of the present invention, each of the first filter and the second filter are based on Artificial Intelligence (AI) based learning models which allow collecting, clustering, and accessing of the first filter and the second filter. Further, the AI based learning model can include a neural network module, a machine-learning module, and/or a deep convolutional neural network.

In an alternative embodiment of the present invention, a system for editing an image to form an edited image using natural language descriptors is disclosed. The system includes an imaging module to receive the image, a speech module to receive a speech from a user, and a processor for processing the image. The processor includes a speech extractor for extracting a context, such as emotion, from the speech, and an encoder-decoder for extracting a number of semantic features from the context. The encoder-decoder generates a tag based on the semantic feature. Further, the system includes a filtering module for generating and applying a filter to the image. The filter is based on natural language descriptors derived from the speech commands including voice instructions with emotions. The application of each of the first filter and the second filter is based on an AI based model.

In an alternative embodiment of the present invention, a system for editing an image captured from an electronic device is disclosed. The system includes an imaging module to receive the image, an input module to receive a textual input from a user, and an encoder-decoder for extracting a number of semantic features from the textual input. The encoder-decoder generates a tag based on the semantic feature. Further, the system includes a filtering module for generating and applying filter to the image. The filtering module includes a first filter, which is extracted by using the tag and applied on the image to form a filtered image. The filtering module includes a second filter, which the second filter is applied on the filtered image based on a user preference to generate the edited image. The application of each of the first filter and the second filter is based on an AI based model.

In another embodiment of the present invention, a method for editing an image to form an edited image is disclosed. The method includes a step of capturing an image, a step of receiving a speech from a user for providing commands related to a number of filters to be applied on the image, a step of extracting a context from the speech, a step of extracting a semantic feature from the context, a step of generating a tag based on the semantic feature, a step of extracting a first filter by using the tag, a step of applying a first filter on the image to generate a filtered image, and a step of applying the second filter on the filtered image based on user preferences to form the edited image.

In yet another embodiment of the present invention, a method for editing an image to form an edited image using an electronic device is disclosed. The method includes a step of capturing an image, a step of receiving a textual input from a user providing commands related to a number of filters to be applied on the image, a step of extracting a semantic feature from the textual input, a step of generating a tag based on the semantic feature, a step of extracting a first filter by using the tag, a step of applying a first filter on the image to generate a filtered image, and a step of applying the second filter on the filtered image based on user preferences to form the edited image.

Other objectives and aspects of the invention will become apparent from the following detailed description, taken in conjunction with the accompanying drawings, which illustrate, by way of example, the features in accordance with several embodiments of the invention.

The invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various aspects of the invention as disclosed. A person with ordinary skills in the art will appreciate that the illustrated element boundaries (e.g. boxes, groups of boxes, or other shapes) in the figures represent only one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "units" represents the dimension in any units such as centimeters, meters, inches, foots, millimeters, micrometer and the like and forms thereof, are not necessarily limited to members in a list with which the words may be associated.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

Figure 1:
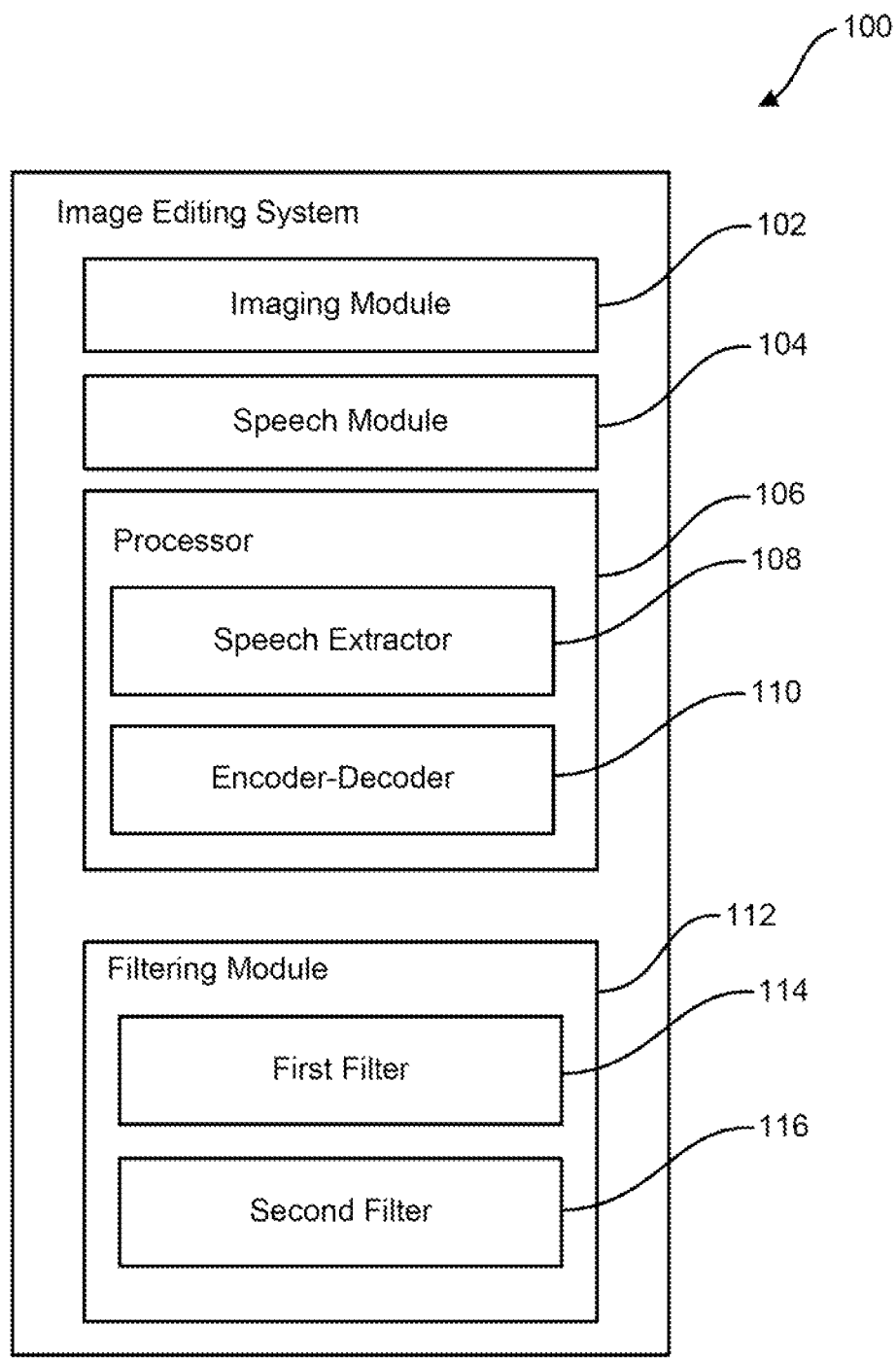
FIG. 1 illustrates a system for editing an image to form an edited image in accordance with the present invention.

FIG. 1 illustrates a system (100) for editing images according to a preferred embodiment of the present invention as disclosed. The system (100) includes an imaging module (102) to receive the image. In one aspect of the present invention, the imaging module (102) is either any lens or camera. The lens and camera is of any electronic devices including cellphones, smart phones, PDA, digital cameras, or other image capturing means and similar devices.

Further, the system (100) includes a speech module (104) to receive speech from a user. The speech is voice commands that includes words, phrases, or sentences spoken by the user. The speech is recorded by a microphone. The microphone may be of any electronic devices or any computing devices. In one aspect of the present invention, speech module may be integrated or part of the computing device or processor.

Further, the system (100) includes a processor (106) for processing the image. The processor (106) is a graphics processing unit used for processing and enhancement of the image. The processor includes microprocessors, application specific integrated circuits (ASICs), field programmable gate arrays (FPGAs), or the like. The processor (106) may further execute instructions in the memory to store the final image. Processing units may control operation of system (100) and its components. The memory may include a random access memory (RAM), a read only memory (ROM), and/or another type of memory to store data and instructions that may be used by the processor (106).

Further, the processor (106) includes a speech extractor (108) for extracting context, such as emotion, mood, or tone, from the speech. Using the speech extractor (108), the context as related to filter description and thus, filters are applied that match the user's current mood.

Further, the processor (106) includes an encoder-decoder (110) for extracting a semantic feature from the context from the speech. Extracting the desired effect through speech-to-text recognition, the extra information, which is emotion, embedded in the voice signal. Further, the context details a filter to be applied.

Further the encoder-decoder (110) generates a tag based on the semantic feature. In another aspect of the present invention, the semantic feature is either a word or text descriptor. The word or text descriptor is an encoded version of the voice commands provided by applying the filters to the image. The tag includes details about a filter to be applied which better match the user's current mood and the commands provided by the user.

Further, the system (100) includes a filtering module (112) for generating and applying filters to the image. The filtering module (112) includes a first filter (114), which is extracted by using the tag and applied on the image to form a filtered image. The first filter (114) is extracted from an image database. Further, the image database is either of a web server, a social networking site, or a web page. The image database may be a memory of any computing device and is screened according to the tag and an aesthetic value.

The application of each of the first filter (114) is based on an artificial intelligence (AI) based model. The image database is trained continuously for updated filters and photos. For the initial set up of the image database, the photos or images are obtained from online sources. The details about the photos or images includes tags, titles, and alike stored in the databases. In addition, for updating the image databases, an open-source image captioning model to compensate possible imprecise or inaccurate tags, titles and alike stored in the database. These photo or images based caption or description is used later, while applying the filter on the image by searching the image database.

To ensure quality, the images undergo a data cleaning process conducted by photography experts or through existing image quality or aesthetic assessment methods. Each image will be rated based on its quality and aesthetic value. The images which score below a pre-determined threshold value are removed from the database. For images collected through social networking sites, such as Facebook. Instagram etc., the aesthetic value or quality is determined by checking the number of likes it received.

In addition, with this image database, various existing keyword search approaches are used to find images related to the filter description provided by the user through voice or typed phrases or commands.

In an exemplary embodiment, the PCA is used as a text encoder to first encode the voice or typed phrases or commands into a vector, which is then compared to those in the image database to search for similar matching filters, that then leads to identification of a set of the images satisfying the given description.

In another exemplary embodiment, a filter transform model is used to extract a first filter (114). The filter transform model includes a filter extraction model. In this model, filtered images already present in the image database are extracted and checked for applied filters. This model is trained in such a way that it converts the filtered images to the original images. By comparing both filtered image and original image, the filter effect is applied from the set of photos. To handle the possibility of different filter styles within that group of images, several methods are used, such as using a weighted average or highest vote number. The final filter obtained is then applied to the new image provided by the user.

In yet another exemplary embodiment of the present invention, an encoder-decoder network structure is used for extracting a first filter (114). In particular, the text description or vocal commands from the user and input image are passed to their respective encoders. Both encoded features are then jointly processed by another neural network block before passed to the decoder to generate the final output. To ensure that the output image matches the text description or vocal commands from the user, the loss function is designed such that a mismatched image and description are penalized, while a correctly matched image and description are rewarded. As for determining the level of mismatch, another model could be used. To train these models, the same image database described earlier can be used.

Further, the filtering module (112) includes a second filter (116) applied on the filtered image based on a number of user preferences to generate an edited image. The user preferences include editing style and image quality associated with the image. The image quality preferences are either of saturation, contrast, size, dimension, and/or sharpness of the image. The editing style preferences are either of brightness, color hue, and/or color palettes. These user preferences are collected either from a questionnaire, web histories, and/or usage history.

The application of the second filter is based on an artificial intelligence (AI) based model. In an exemplary embodiment, an on boarding questionnaire is given to first-time users, (herein asking them to choose their preference between a set of photos or images. Subsequently, each time the user submits a new image for editing, the model outputs a variation of the user preferences, instead of one single and personalized image for the user to choose. Through the constant evaluation of the user's choices, the model analyzes and updates the observed style preference of the user.

In another exemplary embodiment, a new model is used for training the user preferences. This model uses a face recognition approach wherein the images from the image databases are converted into embeddings such that in this Euclidean space, images of high similarity have embeddings closer together. When applying a second filter, image similarity is evaluated based on properties such as brightness, contrast, saturation, color hue, etc. from the image database. To train such a model, a set of training images is set up with the mentioned properties labeled. A deep convolutional network is then trained to output embeddings that are optimized to satisfy the Euclidean distance condition. Once trained, the model embeds these images matching a given user's preferences. These user preferences are then properly represented in the feature space. To ensure that the new filtered image matches the user's preference, the corresponding embedding of this image is closely located to the preference representation in the feature space.

In certain embodiment, the computer-readable instruction included in the system (100) can be a software application. An electronic device includes a mobile application stored in a non-volatile memory. A mobile application (mobile app) may comprise instructions stored in a non-volatile memory of the electronic device, which can be executed by a processor to perform specific functionalities. Mobile apps may provide users with similar services to those accessed and may be individual software units with limited or specific functions. Applications may be available for download from mobile application stores. In certain embodiments, a web server or cloud-based server includes processor (106).

Figure 2:
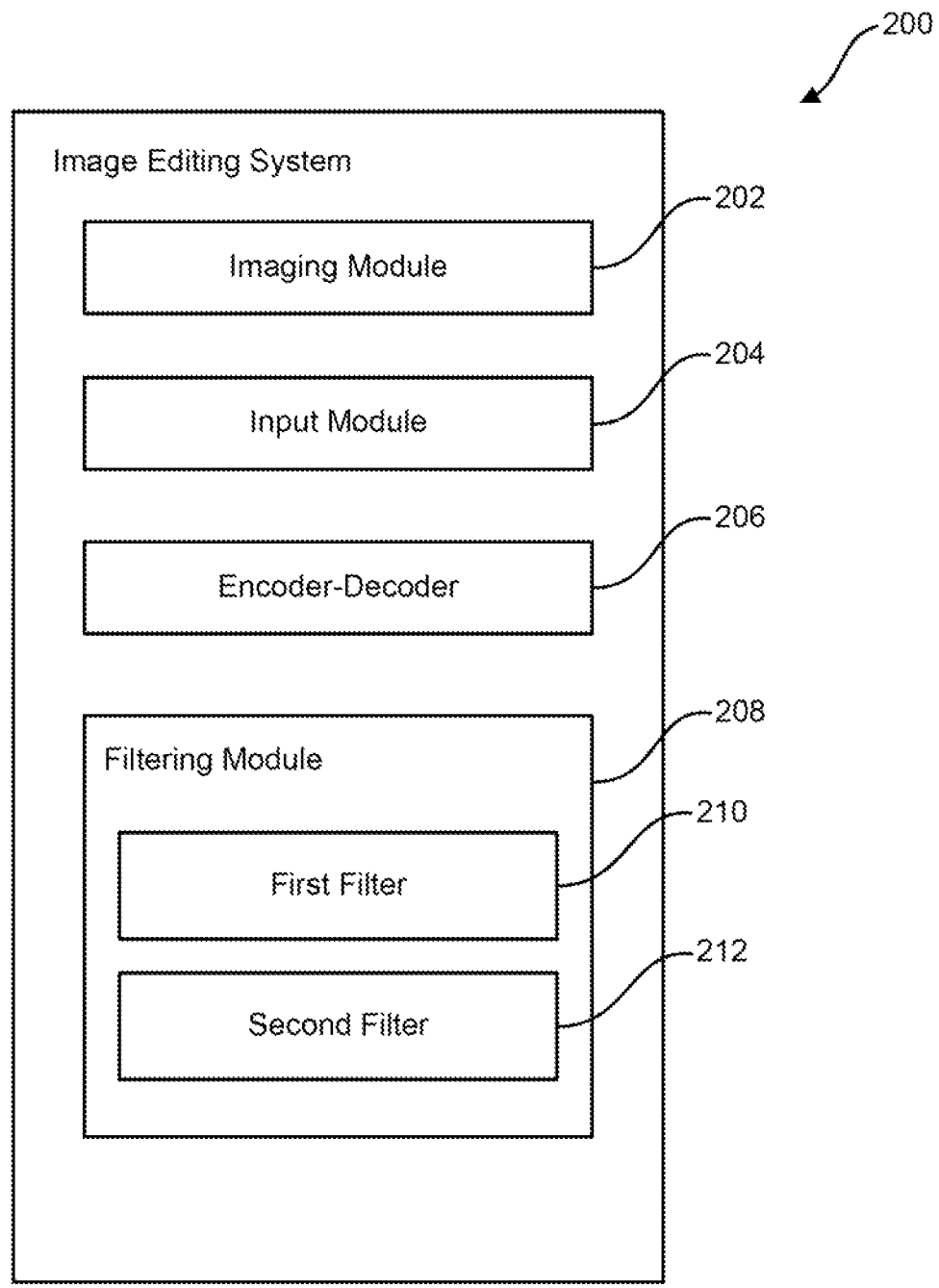
FIG. 2 illustrates an alternative embodiment of the system for editing an image to form an edited image in accordance with the present invention.

FIG. 2 illustrates a system (200) for editing images using an electronic device according to preferred embodiments. The system (200) includes an imaging module (202) to receive the image. The imaging module (202) can be any lens or camera of any electronic devices, including cell-phones, smart phones, PDAs, digital cameras, or other image capturing means and similar devices.

The system (200) includes an input module (204) to receive a textual input from a user. The textual input is a word, a phrase, or a sentence typed by the user on the electronic device.

The system includes an encoder-decoder module (206) for extracting a semantic feature from the textual input of the user. The encoder-decoder (206) generates a tag based on the semantic feature. The semantic feature can be either a word or text descriptor describing the features to be applied. The tag includes details about a filter to be applied which match the user's commands.

The system (200) includes a filtering module (208) for generating and applying filters to the image. The filtering module (208) includes a first tilter (210), which is extracted using the tag and applied on the image to form a filtered image. The first filter (210) can be extracted from an image database. The image database can be either from a web server, a social networking site, or a web page. The image database may be a memory of any computing device. Further, the image database is screened according to the tag and an aesthetic value.

The application of the first filter (210) is based on an artificial intelligence (AI) model. The image database is trained continuously for updated filters and photos. For the initial set up of the image database, the images are obtained from online sources. The image details including tags, titles, and similar date and are stored in the database. In addition, for updating the image database, an open-source image captioning model is used to compensate for possible imprecise or inaccurate stored data. These images are based on caption or descriptions and are while applying the filter on the image by searching the image database.

To ensure quality, the images undergo a data cleaning process conducted by photography experts or through existing image quality or aesthetic assessment methods. Each image will be rated based on its quality and aesthetic value. The images which score below a pre-determined threshold value are removed from the database. For images collected through social networking sites, the aesthetic value or quality is determined by checking the number of likes and/or comments it received.

In addition, with this image database, various existing keyword search approaches are used to find images related to the filter description provided by the user through voice or typed commands.

In an exemplary embodiment, the PCA is used as a text encoder to first encode the voice or typed commands into a vector, which are then compared to those in the image database to search for similar matching ones filters, leading to the identification of a set of the photos or images satisfying the given description.

In another exemplary embodiment of the present invention, for extracting a first filter (210) a filter transform model is used. The filter transform model includes a filter extraction model. In this model, some filtered image already present in the image database are extracted, and checked for already applied filters. This model is trained in such a way that it converts the filtered image to the original looking image. By comparing both filtered image and original image, the filter effect is determined from the set of photos. To handle the possibility of a different filter style within that group of images, there are several methods such as using weighted average or highest vote. The final filter obtained is then applied on the new image provided by the user.

Further, the filtering module (208) includes a second filter (212) applied on the filtered image based on a number of user preferences to generate the edited image. The user preferences include editing style and image quality preferred by the user associated with the image. Further, the image quality preferences are either of saturation, contrast, size, dimension, and/or sharpness of the image. Further, the editing styles preferences are either of brightness, color hue, and/or color palettes. Further, the user preferences are collected either from a questionnaire, web histories, and/or usage history of the user.

The application of the second filter is based on ab artificial intelligence (AI) based model. In an exemplary embodiment, an on boarding questionnaire asks first-time users to choose their preference over a set of photos or images. Subsequently, each time the user submits a new image for editing, the model outputs a variation of the user preferences, instead of one single and personalized image for the user to choose. Through the user's choices, the model analyzes, and when necessary, updates the style preference of the user.

In another exemplary embodiment, a new model is used for training the user preferences. This model uses a face recognition approach in which the images from the image databases are converted into embeddings such that in this Euclidean space, images of high similarity have embeddings closer together. For applying a second filter, the image similarity is evaluated based on properties such as brightness, contrast, saturation, color hue, etc. from the image database. To train such a model, a set of training images is set up with the mentioned properties labeled. A deep convolutional network is then trained to output embeddings that are optimized to satisfy the Euclidean distance condition. Once trained, the model embeds these images matching a given user's preference. This user preference is then properly represented in the feature space. To ensure that the new filtered image matches the user's preference, the corresponding embedding of this image is closely located to the preference representation in the feature space.

In some embodiments, the computer-readable instruction included in the system (200) is known as a software application. An electronic device includes a mobile application stored in a non-volatile memory. In some embodiments, a mobile application (mobile app) may comprise instructions stored in a non-volatile memory of the electronic device, which can be executed by a processor to perform specific functionality. In some embodiments, mobile apps may provide users with similar services to those accessed and may be individual software units with limited or specific functionality. Applications may be available for download from mobile application stores. Further, a web server or cloud-based server includes processor (106).

Figure 3:
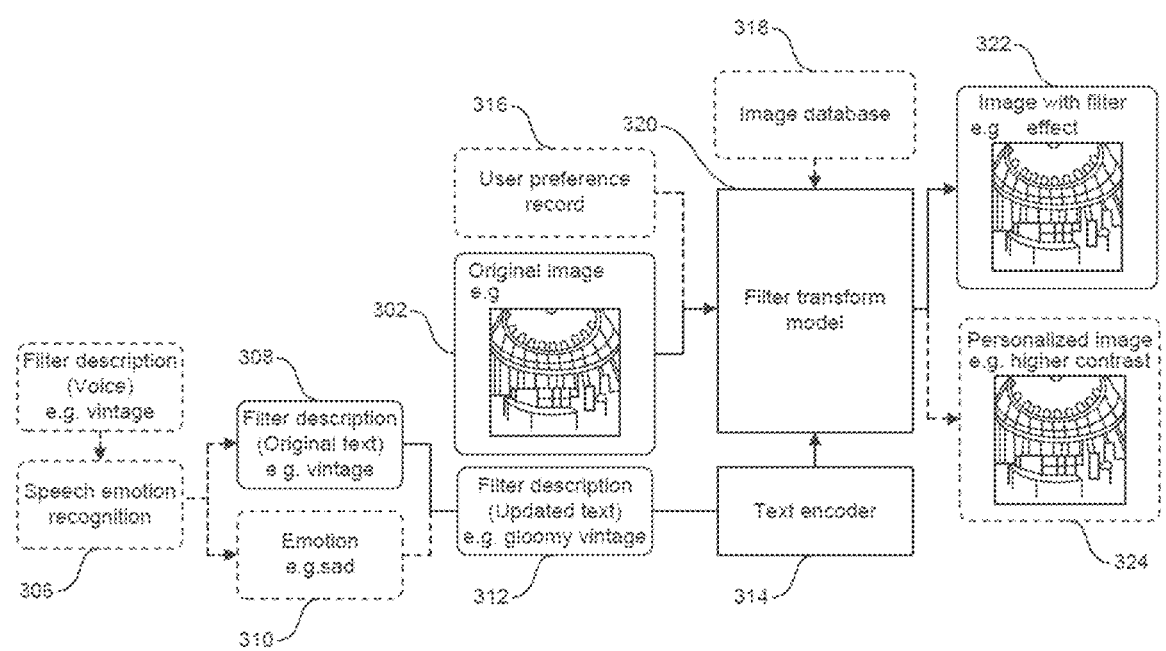
FIG. 3 illustrates a flowchart representing a framework for editing the image in accordance with the present invention.

Referring to FIG. 3, a flowchart representing a system for personalized editing of an image is disclosed. The system utilizes likes through usage history and preferences of a user. The system includes an original image (302) captured by an imaging module of the electronic device. In addition, a voice sample is also captured by a microphone of the electronic device. The electronic device can be any computing device. Further, the system includes a speech emotion recognition engine (306) for recognizing the voice sample and recognizing a filter description (308) and an emotional value (310) from the voice sample. The filter description (308) and the emotional value (310) represent a filter description that is applied in the original image.

Further, the system includes an updated text (312) extracted from the filter description (308) and the emotional value (310) from the voice sample. The updated text (312) is a filter descriptor. In an alternative embodiment, the updated text is a semantic feature identified from the voice sample. The semantic feature is a word or text descriptor describing filters to be applied.

Further, the system includes a text encoder (314) for encoding the context value into an encoded filter descriptor. The system includes a user preference record (316) for adding a user preference for improving the image and giving the image a personalized experience.

The system includes an image databases (318) including already filtered images from a web server or social network. The first filter is extracted from an image database. The image database may be a memory of any computing device. Further, the image database is screened according to the tag and an aesthetic value.

The application of the first filter is based on an artificial intelligence (AI) based model. The image database is trained continuously for updated filters and photos. For the initial set up of the image database, the photos or images obtained from online sources. The details about the photos or images including tags, titles, etc. are stored in the database. In addition, for updating the image database, an open-source image captioning model is used to compensate possible imprecise or inaccurate data stored in the database. These photo or images based caption or description are used later, while applying the filter on the image by searching the image database.

To ensure the quality of the photos or images, the photos or images undergo a data cleaning process conducted by photography experts or through existing image quality or aesthetic assessment methods. For example, each photo will be rated based on its quality and aesthetic value. The images which score below a pre-determined threshold value are removed from the database. For images collected through social networking sites, the aesthetic value or quality is determined by checking the number of likes it received.

In addition, with this image database, various existing keyword search approaches are used to find images related to the filter description provided by the user through voice or typed phrases or commands.

Further, the system includes a filter transformation model (320) for applying a number of filters based on the user preference record (316) and the image database (318). The filter transformation model (320) applies a number of filters bases on the moods, styles, voice samples, etc. to form an image with filtered effects (322). For post-processing the filtered image with effects (322), user preferences are added to form a personalized image (324) with customization provided by the user.

Figure 4:
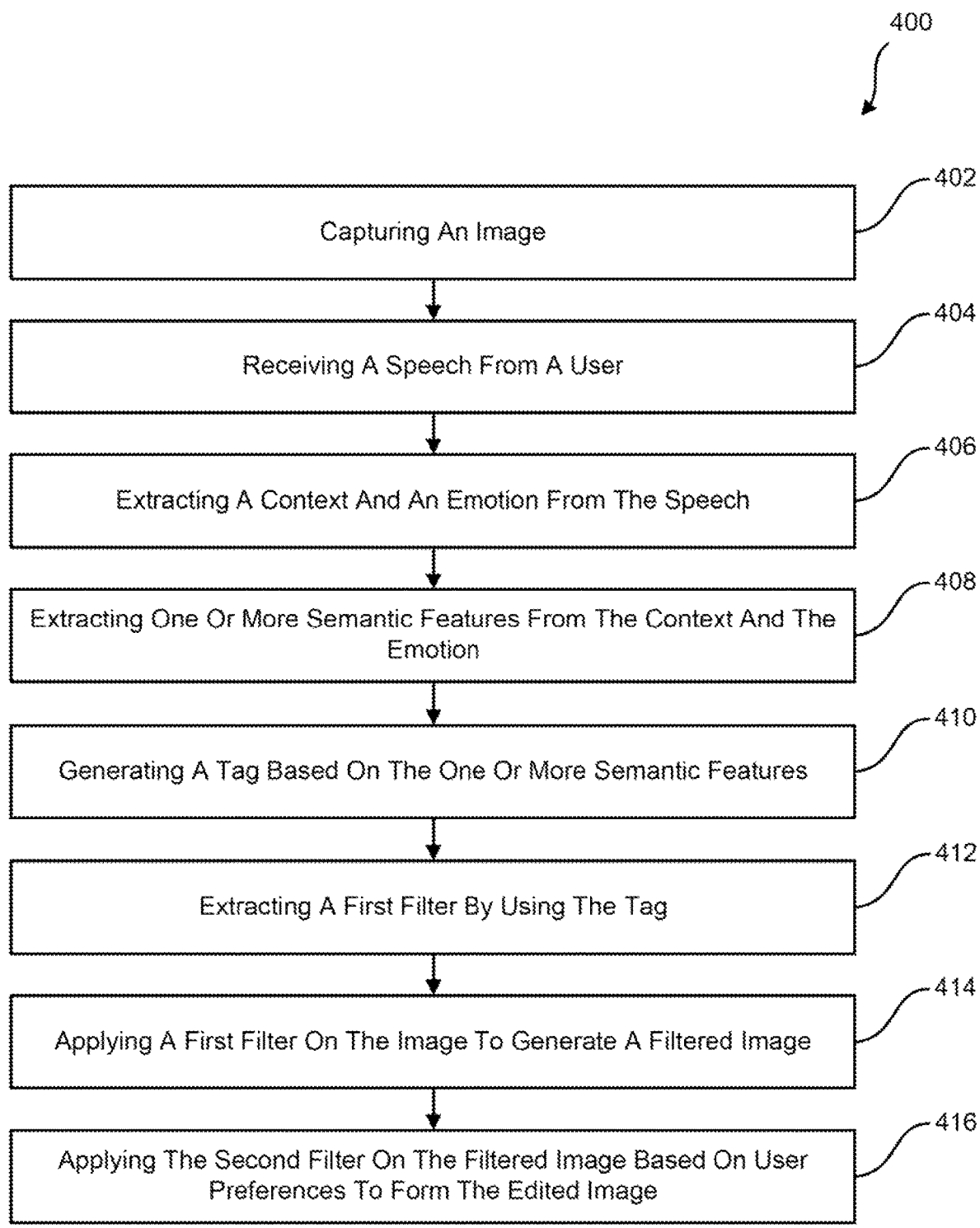
FIG. 4 illustrates a method for editing an image to form an edited image in accordance with the present invention.

Referring to FIG. 4, a method (400) for editing an image to form an edited image is disclosed. The method (400) includes step (402) of capturing an image by an imaging module. The imaging module can be any lens or camera.

The method (400) includes step (404) of receiving speech from a user in the form of commands related to a number of filters to be applied on the image. As stated throughout, the lens/camera can be of any electronic device, such as a cellphone, smartphone, PDA, digital camera, or other similar image capturing means and devices.

The method (400) includes step (406) of extracting context and an emotion from the speech using a speech extractor. The context is then related to a filter description and, thus, a filter is applied which match the user's perceived mood.

The method (400) includes step (408) of extracting one or more semantic features from the context and the emotion using an encoder-decoder module. Speech-to-text recognition extracts the semantic/emotion information embedded in the voice signal. Then the context details about a filter can be applied.

The method (400) includes step (410) of generating a tag based on the extracted semantic feature. The semantic feature can be either a word or text descriptor. The word or text descriptor is the encoded version of voice commands provided for applying the filters to the image. The tag includes details about a filter to be applied which better match the user's current mood and commands.

The method (400) includes step (412) of extracting a first filter by using the tag. The first filter is extracted from an image database. The image database is either from a web server, a social networking site, a web page, and/or the internet. Similarly, the image database may be from a memory of any computing device. The image database is screened according to the tag and an aesthetic value. Further, the method (400) includes step (414) of applying a first filter on the image to generate a filtered image.

The method (400) includes step (416) of applying the second filter on the filtered image based on user preferences to form the edited image. The second filter is based on a number of user preferences to generate the edited image. The user preferences include editing style and image quality associated with the image.

Figure 5:
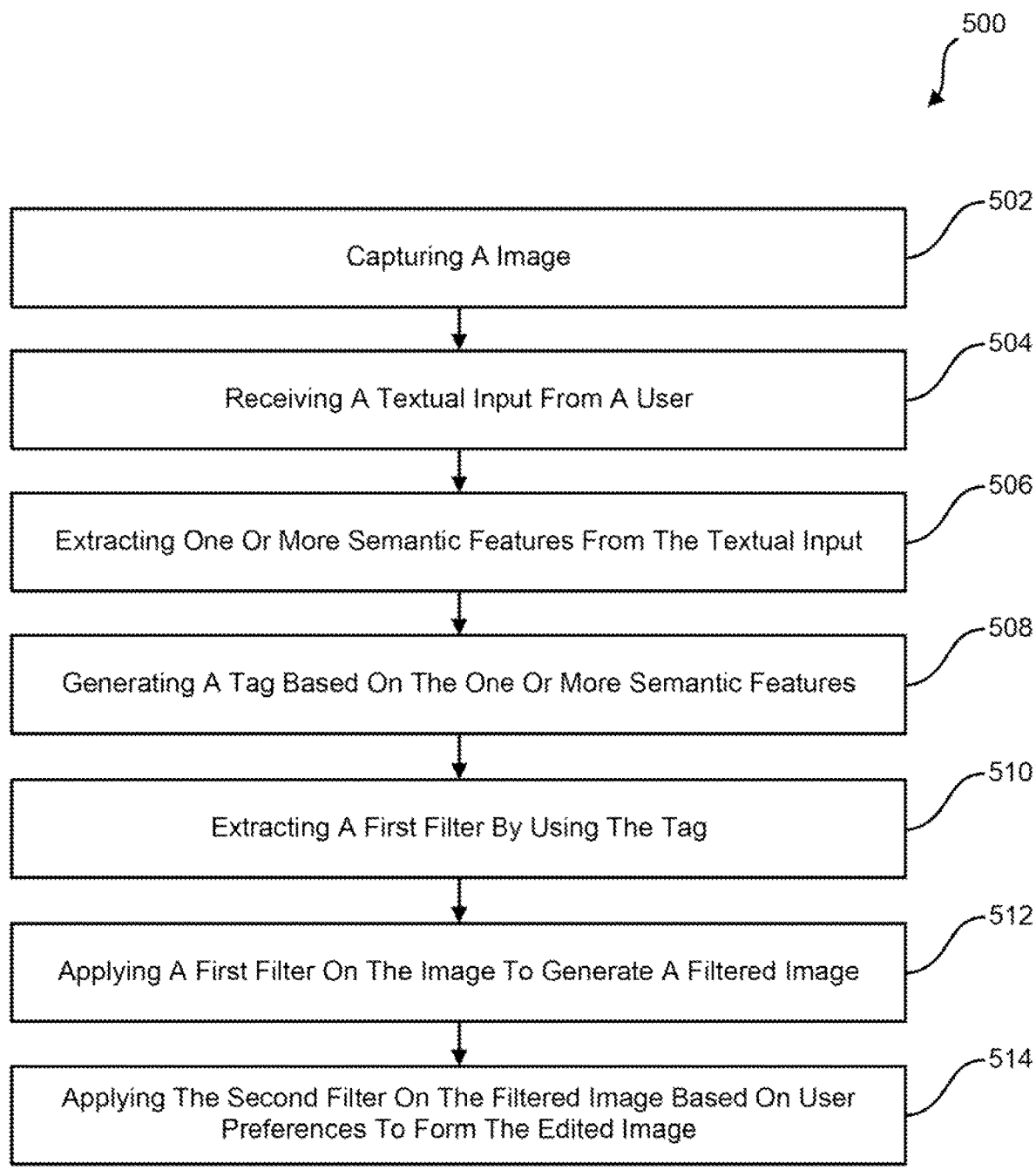
FIG. 5 illustrates an alternative embodiment of a method for editing an image to form an edited image in accordance with the present invention.

Referring to FIG. 5, a method (500) for editing an image to form an edited image using an electronic device is disclosed. Further, the method (500) includes step (502) of capturing an image by an imaging module. The imaging module can be a lens or camera.

The method includes step (504) of receiving a textual input from a user for providing commands related to a number of filters to be applied on the image. The textual input can be provided by any electronic device, as disclosed throughout.

The method (500) includes step (506) of extracting a semantic feature from the textual input using an encoder-decoder module. Further, the method (500) includes step (508) of generating a tag based on the semantic feature. The semantic feature can be a word or text descriptor. The word or text descriptor is the encoded version of voice commands provided for applying the filters to the image. The tag includes details about a filter to be applied which better match the user's current mood and commands.

The method (500) includes step (510) of extracting a first filter by using the tag. The first filter is extracted from an image database. The image database is either from a web server, a social networking site, a web page, and/or the internet. Similarly, the image database may be from a memory of a computing device. The image database is screened according to the tag and an aesthetic value. Further, the method (500) includes step (512) of applying a first filter on the image to generate a filtered image.

Further, the method (500) includes step (514) of applying the second filter on the filtered image based on user preferences to form the edited image. The second filter is based on a number of user preferences to generate the edited image. The user preferences include editing style and image quality preferences associated with the image.

The invention claimed is:

1. An image editing system comprising:
an imaging module to receive an image;
a speech module to receive a natural language speech from a user;
a speech extractor for extracting context from the received natural language speech;
an encoder-decoder for extracting a semantic feature from the context and for generating a tag based on the semantic feature, wherein the tag determines a filter to be applied based on natural language descriptors derived from the speech commands including voice instructions with emotions and to match the user's current mood; and
a filtering module comprising:
a first filter, wherein the first filter is extracted based on the tag and applied on the image to form a filtered image;
a second filter, wherein the second filter is applied on the filtered image based on one or more user preferences to generate an edited image for the purpose of updating the image; and
wherein the encoder-decoder passes the voice or typed phrases from the user and input image to their respective encoders and the encoded features are jointly processed by another neural network block before being passed to the decoder to generate the final output.

2. The system of claim 1, wherein the imaging module is a lens or a camera.

3. The system of claim 1, wherein the speech module is a microphone.

4. The system of claim 1, wherein the semantic feature is a word or text descriptor.

5. The system of claim 1, wherein the first filter is extracted from an image database.

6. The system of claim 5, wherein the image database is from a web server, a social networking site, or a web page.

7. The system of claim 5, wherein the image database is screened according to the tag and an aesthetic value.

8. The system of claim 1, wherein the user preferences are an editing style data or an image quality data associated with the image.

9. The system of claim 8, wherein the image quality data is saturation, contrast, size, dimension, or sharpness.

10. The system of claim 8, wherein the editing style data is brightness, color hue, or color palettes.

11. The system of claim 8, wherein the user preferences are collected from a questionnaire, a web history, or a user usage history.

12. The system of claim 1, wherein the first filter and the second filter are based on an artificial intelligence based learning model that allows collecting, clustering, and accessing.

13. The system of claim 12, wherein the artificial intelligence based learning model is a neural network module, a machine-learning module, or a deep convolutional neural network.

14. An image editing system comprising:
an image captured from an electronic device;
an imaging module to receive the image;
an input module to receive a textual input from a user;
an encoder-decoder for extracting a semantic feature from the textual input and for generating a tag based on the semantic feature, wherein the tag determines a filter to be applied based on natural language descriptors derived from the speech commands including voice instructions with emotions and to match the user's current mood;
a filtering module comprising:
a first filter, wherein the first filter is extracted by using the tag and applied on the image to form a filtered image; and a second filter, wherein the second filter is applied on the filtered image based on one or more user preferences to generate an edited image for the purpose of updating the image;

wherein the encoder-decoder passes the voice or typed phrases from the user and input image to their respective encoders and the encoded features are jointly processed by another neural network block before being passed to the decoder to generate the final output; and wherein application of each of the first filter and the second filter is based on an artificial intelligence based model.

15. The system of claim 14, wherein the electronic device is a digital camera, a PDA, a mobile device, a tablet, or a laptop.

16. An image editing system comprising:
an imaging module to receive an image;
a speech module to receive speech from a user;
a speech extractor for extracting context from the speech;
an encoder-decoder for extracting a semantic feature from the context and for generating a tag based on the semantic feature, wherein the tag includes details about determines a filter to be applied based on natural language descriptors derived from the speech commands including voice instructions with emotions and to match the user's current mood; and
a filtering module comprising:
a first filter, wherein the first filter is extracted by using the tag and applied on the image to form a filtered image; and
a second filter, wherein the second filter is applied on the filtered image based on one or more user preferences to generate an edited image for the purpose of updating the image;

wherein the encoder-decoder passes the voice or typed phrases from the user and input image to their respective encoders and the encoded features are jointly processed by another neural network block before being passed to the decoder to generate the final output; and wherein application of each of the first filter and the second filter is based on an artificial intelligence based model.

17. An image editing method comprising:
capturing an image;
receiving speech from a user;
extracting context from the speech;
extracting a semantic feature from the context;
generating a tag based on the semantic feature, wherein the tag determines a filter to be applied based on natural language descriptors derived from the speech commands including voice instructions with emotions and to match the user's current mood;
extracting a first filter based on the tag;
applying a first filter on the image to generate a filtered image; and
applying a second filter on the filtered image based on one or more user preferences to form an edited image for the purpose of updating the image.

18. An image editing method comprising:
capturing an image;
receiving a textual input from a user;
extracting a semantic feature from the textual input;
generating a tag based on the semantic feature, wherein the tag determines a filter to be applied based on natural language descriptors derived from the speech commands including voice instructions with emotions and to match the user's current mood;
extracting a first filter based on the tag;
applying a first filter on the image to generate a filtered image; and
applying a second filter on the filtered image based on one or more user preferences to form an edited image for the purpose of updating the image.

* * * * *